F. J. MULLEN.
NUT LOCK.
APPLICATION FILED MAY 5, 1914.
1,124,056.
Patented Jan. 5, 1915.
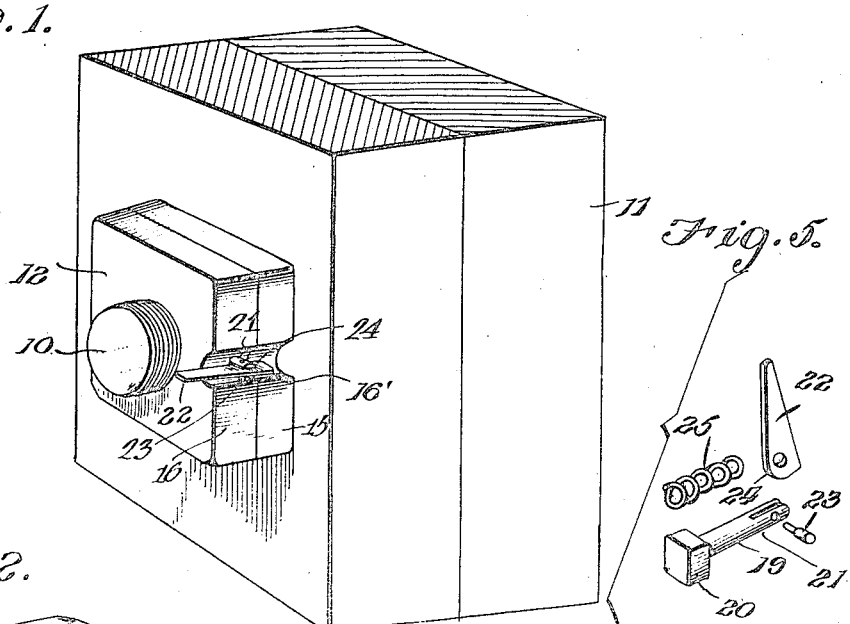
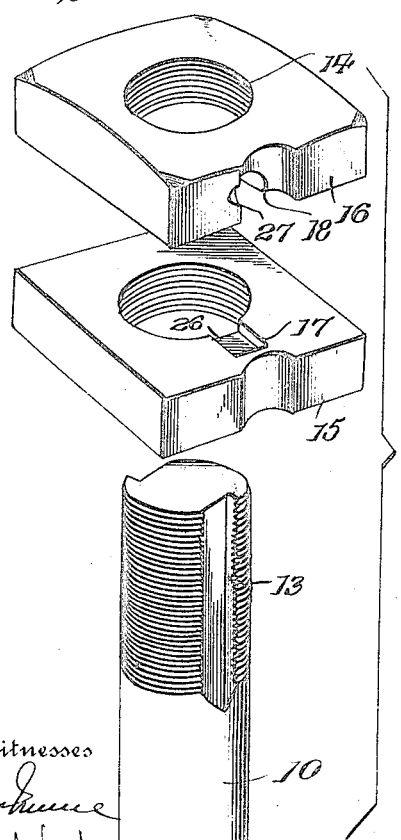
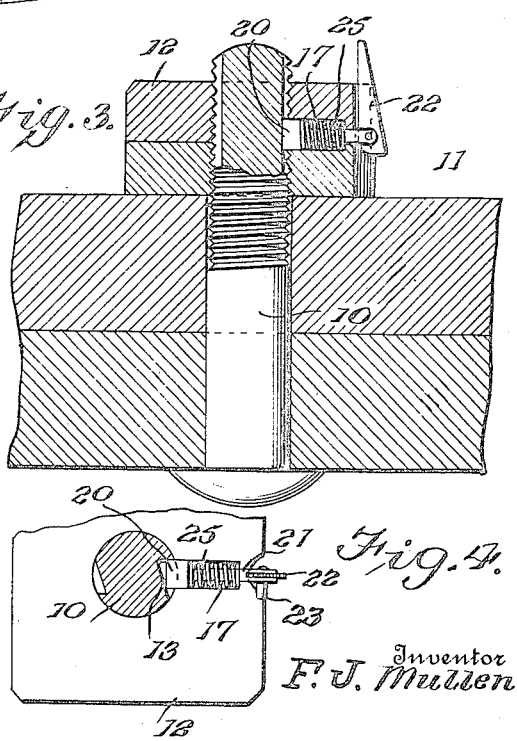
Inventor
F. J. Mullen.

UNITED STATES PATENT OFFICE.

FRANK J. MULLEN, OF LEASBURG, MISSOURI.

NUT-LOCK.

1,124,056.       Specification of Letters Patent.       Patented Jan. 5, 1915.

Application filed May 5, 1914. Serial No. 836,473.

*To all whom it may concern:*

Be it known that I, FRANK J. MULLEN, citizen of the United States, residing at Leasburg, in the county of Crawford and State of Missouri, have invented certain new and useful Improvements in Nut-Locks, of which the following is a specification.

This invention relates to nut locks and more particularly to an improved device of this character including a spring actuated pawl which is carried by the nut and so arranged as to normally project into the bolt opening formed in the nut to engage with a suitable grooves formed in the bolt, and has for its primary object to provide a construction wherein the pawl may be readily mounted within the nut, the nut providing a housing for the pawl, and wherein the pawl may be readily moved to inoperative position to permit the removal of the nut from the bolt.

A further object of the invention is to provide a construction wherein the pivot pin connecting the pawl and the operating lever therefor, will form a stop so arranged as to limit the pawl in its inward movement in engagement with the bolt, said stop being disposed to seat in a suitable recess formed in the adjacent face of the nut. And a still further object of the invention is to generally improve the construction and increase the efficiency of devices of the above described character.

With these and other objects in view my invention will be more fully described, illustrated in the accompanying drawings and then specifically pointed out in the claims which are attached to and form a part of this application.

In the accompanying drawings: Figure 1 is a perspective view showing my improved nut lock applied, Fig. 2 is a detail perspective view showing the sections of the nut separated but in proper relative position with reference to the bolt which is partly broken away, the pawl being removed, Fig. 3 is a transverse sectional view showing the nut in operative position upon the bolt with the pawl in engagement therewith, Fig. 4 is a sectional view of the bolt and showing the nut partly broken away, the pawl in engagement with the bolt and the disposition of the pivot pin for the lever of the pawl, said pin forming a stop for the pawl when in operative position, and Fig. 5 is a detail perspective view of the pawl and the parts connected therewith, said parts being shown detached but in proper relative position.

Corresponding and like parts are referred to in the following description and indicated in all the views of the drawings by the same reference characters.

Referring now more particularly to the drawing, I have illustrated in Fig. 1 thereof, a bolt 10 which is shown as extending through the work 11. The bolt 10 is screw threaded adjacent one extremity in the usual manner to receive the nut 12 and is provided with a plurality of longitudinally extending grooves 13 each of which is provided with a radial straight wall and a corresponding inclined wall, the said grooves 13 being coextensive with the threaded portion of the bolt.

The nut 12 is formed with the usual threaded bolt opening 14 disposed to receive the bolt 10 and for the purpose of inserting the locking mechanism is formed in two superposed sections 15 and 16. Formed on one side wall of the nut midway between the end thereof is a transversely extending groove 16', such groove opening at its extremities upon the upper and lower faces of the nut.

The sections 15 and 16 of the nut 12 when in assembled position as shown in Fig. 1 of the drawings may be secured together in any suitable manner. Medially formed in the confronting faces of the sections 15 and 16 is a suitable recess 17 which communicates with the bolt opening 14 and communicating with said recess and groove 16' is a suitable aperture 18, the aperture 18 opening upon the inner face of the section 16 as shown. A pawl 19 is provided which includes a suitable head 20 and a shank 21, the head of the pawl being arranged within the recess 17, while the shank thereof is disposed to extend through the aperture 18 and into the groove 16' as shown, and it will be observed that the pawl 19 is arranged radially to the axis of rotation of the nut. The free extremity of the shank 21 is slotted longitudinally to receive the lever 22 which is enlarged at one extremity and is eccentrically mounted upon the shank being connected therewith by a pivot pin 23. One edge of the lever 22 at the enlarged extremity thereof is cut away to provide a cam face 24 and it will be observed that the opposite edge of said lever is straight throughout its entire length. Positioned within the recess 17 and surrounding the shank 21 of the pawl is a helical spring 25, said spring being interposed between the head 20 of the pawl and the rear wall of said recess, and normally acting to project the pawl into the bolt opening of the nut to engage within the grooves formed in the bolt.

The head 20 of the pawl is preferably formed with flat side faces as shown, and it will be noted that the adjacent face of said head is arranged to contact with the adjacent flat face 26 of the recess 17. Consequently, the pawl 19 will move freely within the nut. The cam face 24 of the lever 22 is normally arranged to contact with the adjacent face of the nut and as will be readily understood, the actuation of said lever upon its pivot will cause the head 20 of the pawl to be withdrawn within the recess 17 and out of engagement with the bolt. In the operative position of the pawl, the lever 22 will be disposed within the recess 16' as shown in Figs. 1, 3, and 4 of the drawings in which position of said lever, the head of the pawl will engage within one of the grooves 13 formed in the bolt to thus prevent retrograde movement of the nut. To release the pawl 19, the lever 22 may be swung to one side to withdraw the pawl 19 from the groove 13.

Particular attention is directed to the peculiar formation and disposition of the pivot pin 23. Such pin is arranged to project laterally upon one side of the shank 21 and in the operative position of the pawl in engagement with the bolt, seats within a suitable recess 27 formed in the adjacent side face of the nut which recess opens upon the groove 16'. Said pivot pin therefore provides a stop for the pawl so arranged as to limit the pawl in its inward movement within the nut, the pivot pin 23 being so disposed that when seated in said recess, the adjacent edge of the lever 22 will be slightly spaced from the adjacent wall of the groove 16'. As will be obvious, the lever 22 being spaced from the adjacent face of the nut or being relatively free, when the pawl is in engagement with the bolt, any slight movement of said lever upon its pivot will not effect the movement of the pawl 19 since to retract said pawl, the lever 22 must first be rotated upon its pivot to bring the adjacent face of the lever into contact with the adjacent face of the nut This is an important feature of advantage in my invention, in that the lever 22 in the operative position of the pawl 19 is at all times relatively free and any slight contact with said lever will not serve to either partially or wholly effect the disengagement of the pawl 19. It will therefore be seen that I provide a very simple and efficient construction for the purpose set forth such as will positively prevent retrograde movement of the nut upon the bolt and which may be operated to free the nut when desired.

Having thus described my invention what I claim and desire to secure by Letters Patent is:—

1. A nut lock including a bolt, a nut screw threaded thereon, said nut being formed in sections secured together, said sections being provided with coinciding recesses and the end wall of the recess of one of said sections having an aperture formed therein opening upon one side face of the nut, a spring pressed pawl mounted in said recesses and extending through said aperture, said pawl being disposed to engage the bolt, an operating lever carried by the pawl and arranged exteriorly of the nut, and a stop carried by the pawl, said stop being adapted to limit the pawl in its inward movement in engagement with the bolt and maintain the adjacent face of the operating lever in spaced relation to the adjacent face of the nut.

2. A nut lock including a bolt, a nut screw threaded thereon, said nut having a transversely extending groove formed in one side face thereof and being provided with a recess opening upon said groove, a spring pressed pawl carried by the nut and disposed to engage the bolt, said pawl including a shank, an operating lever carried by the shank and adapted to retract the pawl to inoperative position, and a pin pivotally connecting said lever with the shank, said pin being arranged to extend laterally upon one side of the shank and providing a stop arranged to seat in said recess in the operative position of the pawl to limit said pawl in its inward movement in engagement with the bolt and maintain the operating lever relatively free within said groove.

In testimony whereof I affix my signature in presence of two witnesses.

FRANK J. MULLEN. [L. S.]

Witnesses:
T. N. REEVES,
W. B. KING.